United States Patent [19]
Kajrup

[11] 3,919,756
[45] Nov. 18, 1975

[54] BALL PLUG VALVE AND METHOD OF MAKING THE SAME

[75] Inventor: Bengt Ake Kajrup, Malmo, Sweden

[73] Assignee: Saab Scania Aktiebolag, Linkoping, Sweden

[22] Filed: Apr. 15, 1974

[21] Appl. No.: 461,152

Related U.S. Application Data

[62] Division of Ser. No. 280,475, Aug. 14, 1972, Pat. No. 3,819,150.

[52] U.S. Cl. ............. 29/157.1 R; 29/446; 29/470.5; 29/455; 29/520
[51] Int. Cl.² .................... B23P 15/00; B23P 11/00
[58] Field of Search.... 29/157.1 R, 445, 446, 470.5, 29/455, 520; 251/366, 367, 359, 315, 310

[56] References Cited
UNITED STATES PATENTS

| | | | |
|---|---|---|---|
| 2,448,483 | 8/1948 | Bassett | 251/359 |
| 2,797,704 | 7/1957 | McDermott et al. | 29/157.1 R |
| 3,083,945 | 4/1963 | Shafer et al. | 251/315 |
| 3,107,895 | 10/1963 | Vogeli | 251/359 |
| 3,204,924 | 9/1965 | Bredtschneider | 251/315 |
| 3,235,226 | 2/1966 | Allen | 251/315 |
| 3,241,808 | 3/1966 | Allen | 251/315 |
| 3,669,406 | 6/1972 | Moore | 251/317 |

FOREIGN PATENTS OR APPLICATIONS 1,233,525  5/1971  United Kingdom.................. 251/315

Primary Examiner—C. W. Lanham
Assistant Examiner—Dan C. Crane

[57] ABSTRACT

The body of a ball plug valve comprises a unitary outer tubular part and annular seat members, one at each side of the valve element, coaxially secured therein as by welds around their axially outer ends. A resilient seal ring on the inner end of each seat member is compressed between it and the valve element. Until welding is completed, the axial positions of the seat members relative to the tubular part are established by the valve element stem, confined to rotation relative to said part, and by a fixture exerting axial converging force on the seat members. Before welding, and after the fixture-held assembly is inserted, end portions of the tubular part are reduced in diameter to define ports smaller than the valve element.

4 Claims, 5 Drawing Figures

BALL PLUG VALVE AND METHOD OF MAKING THE SAME

This application is a division of my co-pending application Ser. No. 280,475 filed Aug. 14, 1972, now U.S. Pat. No. 3819150.

This invention relates to ball plug valves, and is concerned more particularly with an improved valve of that type and the method of manufacturing the same.

In a ball plug valve the valve element is a generally spherical part which is confined to rotation in a body that defines an inlet port at one side of the valve element and a coaxial outlet port at its other side. The ball valve element is rotatable on an axis transverse to that of the parts, and in its open position a bore through it aligns with coaxial passage portions in the body to permit fluid to flow between the ports. When rotated through about 90° from its open position, the valve element of course blocks such fluid flow.

The valve element must be housed in a chamber in the medial portion of the body that is larger in diameter than the passage portions adjacent to it. To prevent excessive pressure drop through the valve, the diameter of the bore through the valve element should be as nearly as possible equal to that of the passage portions in the body at each side of the valve element, or more accurately, should not be very much smaller than the passage or bore through the ball or tubing at axially opposite sides of the valve body to which the valve body is connected. The flow resistance factor of a valve, which can be regarded as a quality factor for it, is dependent upon the relationship between the inside diameter of that ducting and the diameter of the bore through the ball element. In turn, the last mentioned diameter relationship controls the maximum diameter of the coaxial passage portions in the valve body at opposite sides of the ball element, and also controls the outside diameter of the ball element, since it is well known in the art that geometrical and functional considerations require that the diameter of the spherical external surface of a ball valve element be not less than one and one-half times the diameter of the passage or bore through it.

In practice, a valve is designed for cooperation with ducting of a particular inside diameter; the inside diameter of the intended ducting controls the diameter of the flow passage in the valve body; the passage portion that comprises the bore through the ball element must have a diameter large enough to produce no undue restriction to flow through the valve; and the ball element must have an outside diameter that is at least one and one-half times the diameter of the bore through it.

In every case the ball element of a satisfactory valve must have an outside diameter too large to be received in the end portions of the valve body to which the ducting connections are made.

In the past the need for maintaining this essential relationship between the outside diameter of the ball and the inside diameter of the end portions of the body has been regarded as absolutely precluding the use of a one-piece body — with one rather interesting exception. The valve of Freeman U.S. Pat. No. 3,490,734 has a one-piece body with flow passage smaller in diameter than the ball element, and has its ball element made of an elastically deformable material so that it could be compressed and thus forced into the medial portion of the body through the smaller diameter flow passages. But a valve with an elastically deformable ball obviously has severe limitations that render it unacceptable for many kinds of service.

A substantially hard ball element, such as is necessary for a ball valve of wide utility, obviously cannot be squeezed down to a size that will enable it to be inserted into a valve body through a smaller diameter flow passage therein. Therefore the body must be made to accommodate the ball element, rather than vice versa.

A further requirement for a satisfactory ball valve is that its body must have a circular seal around the passage portion on at least one side of the valve element to provide a seat.

It has heretofore been conventional to manufacture ball valves with bodies made of forged parts that were welded together. Provided the welds were carefully made, such a body was both strong and simple. However, the welding operation entailed certain risks and expenses, inasmuch as the weldments had to be carefully checked for soundness, often with the use of X-Ray equipment. It sometimes happened, though, that even careful inspection did not detect transformations of the material that had resulted from the welding operation, so that even though a weld appeared to be sound, a part of the body had a local weakness or a decreased corrosion resistance. Prior manufacturing procedures involving welding also entailed increased costs of the machining operations that were performed before and after the welding.

By contrast, the present invention has as its object to provide a ball plug valve that has all the advantages of one successfully made by the prior forging and welding procedure but which does not possess the disadvantages of such prior valves and which, in particular, has a one-piece body.

It is also an object of this invention to provide a method of manufacturing a light, simple and inexpensive but sturdy valve of the character described, which method enables the valve to have a one-piece body, involves a miminum of machining operations and permits the valve element and its cooperating seat portions of the body to be established very accurately in a predetermined relationship to one another without the necessity for maintaining uneconomically close tolerances in manufacturing and assembling the parts, or employing great skill or expensive equipment for the manufacturing and assembling operations.

With these observations and objectives in mind, the manner in which the invention achieves its purpose will be appreciated from the following description and the accompanying drawings, which exemplify the invention, it being understood that such changes may be made in the precise method of practicing the invention and in the specific apparatus disclosed herein as come within the scope of the appended claims.

The accompanying drawings illustrate several complete examples of practice of the method and embodiments of the invention according to the best modes so far devised for the practical application of the principles thereof, and in which.

Figure 3:
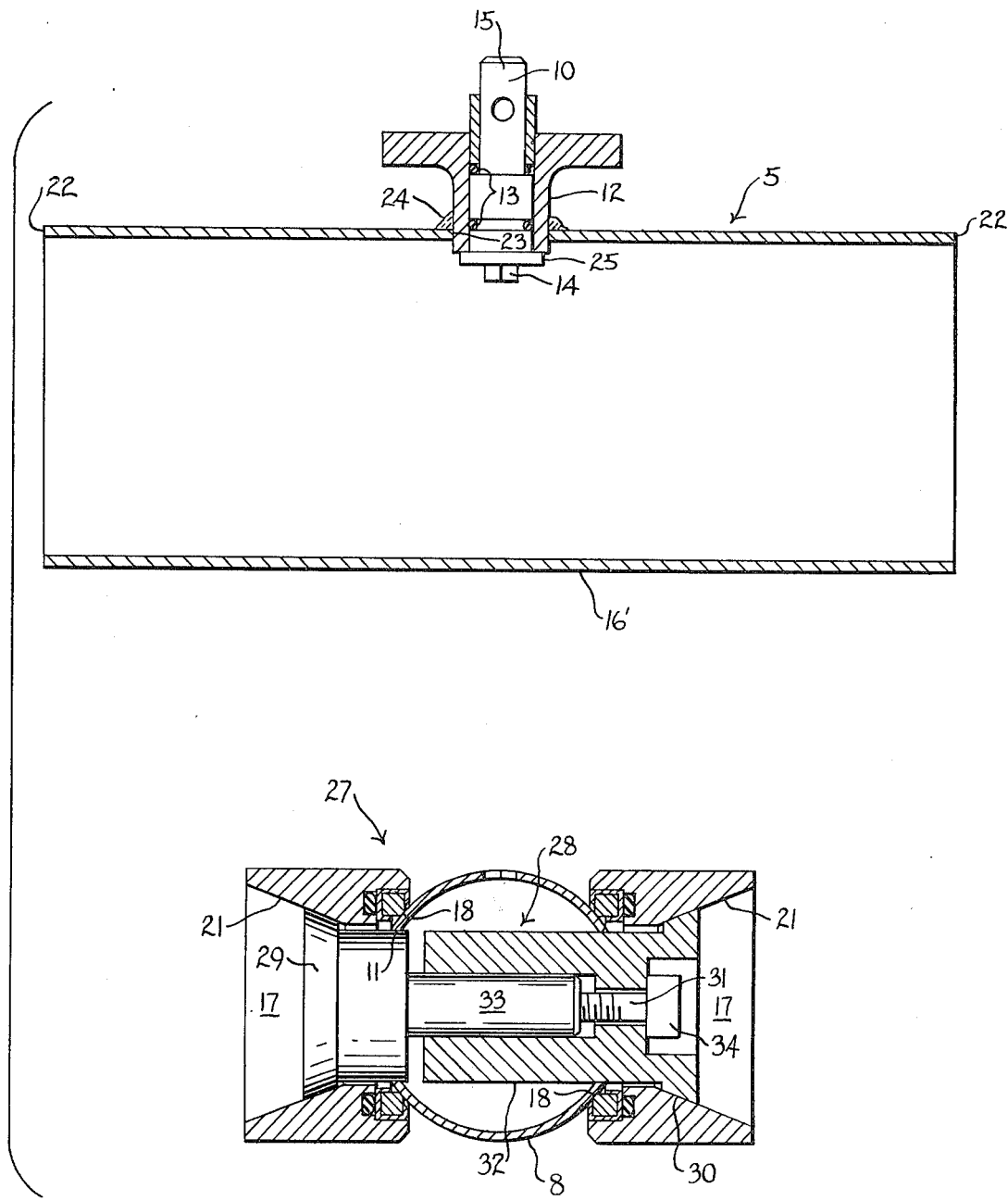
FIG. 3 is a composite longitudinal sectional view of the components of the modified embodiment of the valve, shown in disassembled relation and with a fixture applied to certain of the parts for assembly of the valve in accordance with the principles of the invention.
Figure 4:
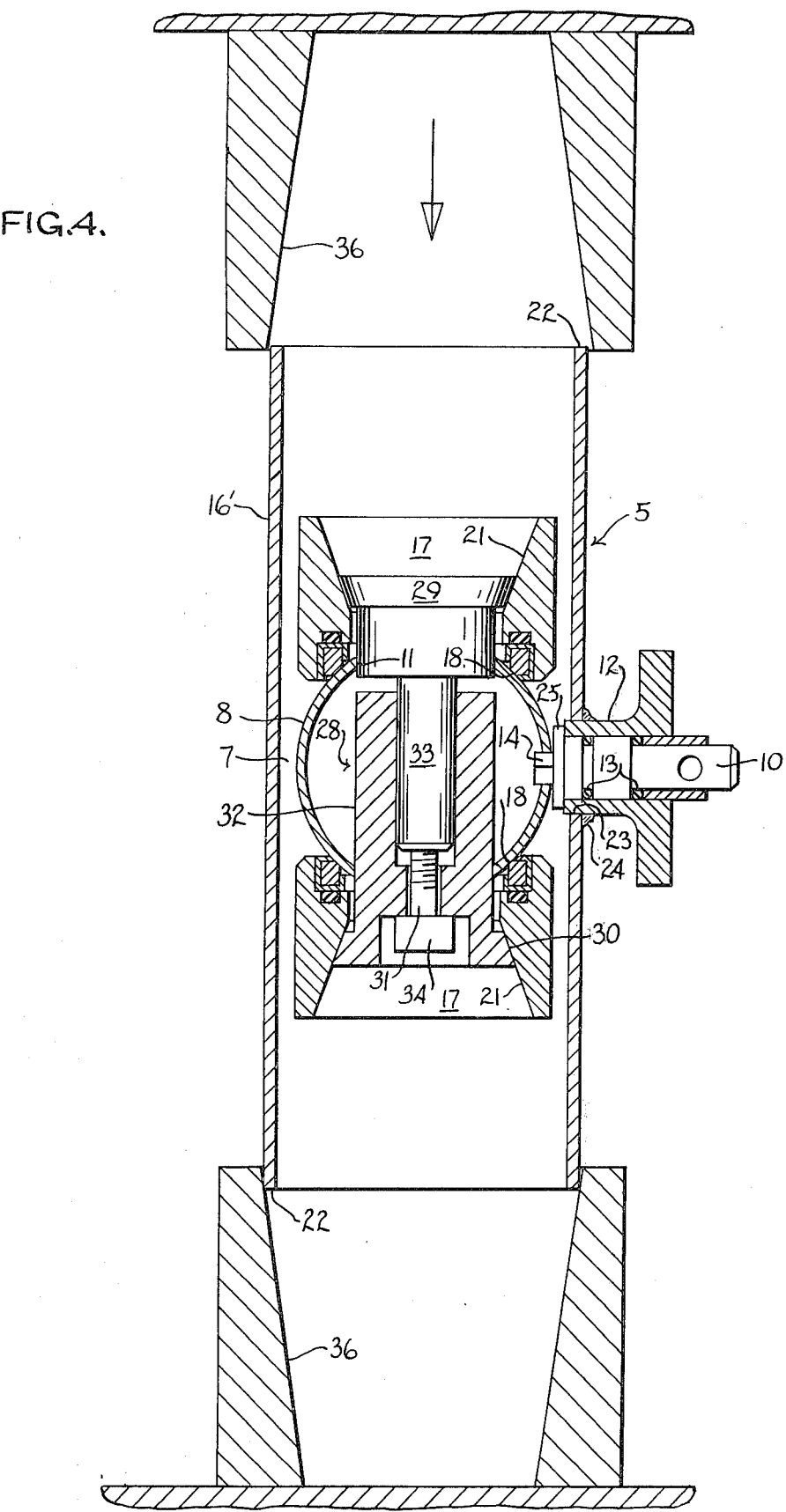
Figure 5:
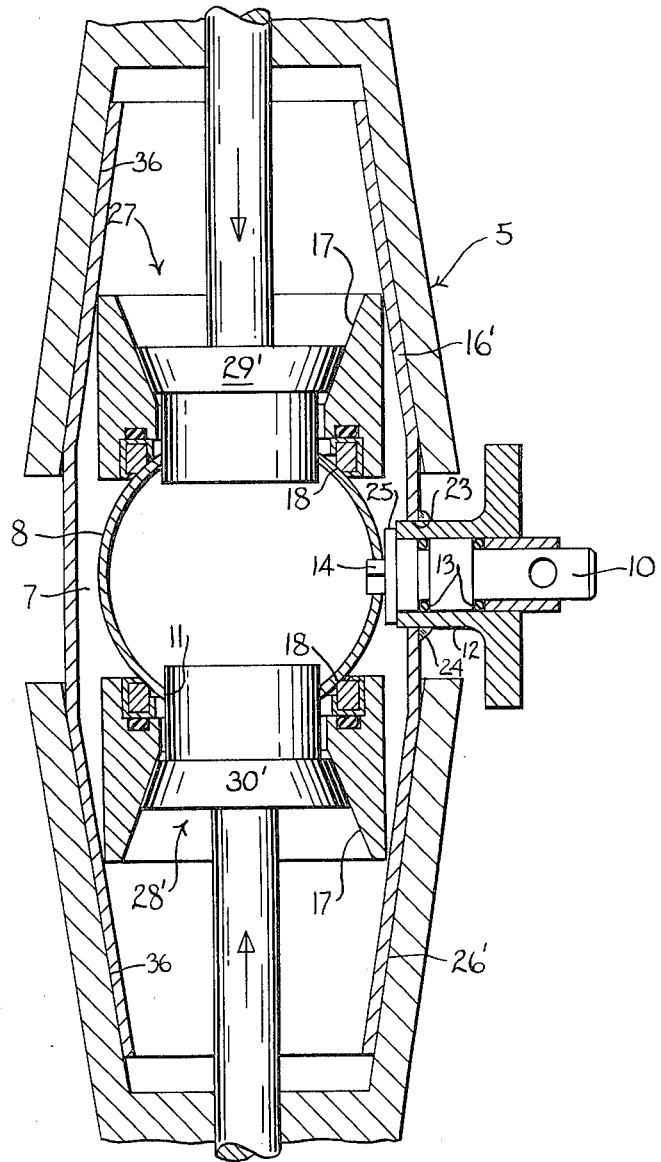

FIG. 4 is a view generally similar to FIG. 3, but illustrating the valve in a partially assembled state and in its relation to apparatus employed at one stage of the manufacturing operation; and FIG. 5 is a more or less diagrammatic view in longitudinal section that corresponds generally to FIG. 4 but illustrates a modified form of apparatus for temporarily holding the valve element and seat members in their desired relationship to one another.

Referring now more particularly to the accompanying drawings, the numeral 5 designates generally the hollow, more or less tubular body of a valve of this invention, in which there are straight coaxial fluid passage portions 6 that lead inward to a chamber 7 in the center of the body wherein there is a rotatable ball type plug valve element 8. The outer end of each passage portion 6 comprises a port 9. Since fluid can flow in either direction through the valve body, either of the ports 9 can be taken as the inlet.

By means of a stem 10 that is connected with the valve element and extends to the exterior of the body, the valve element is rotatable between open and closed positions about an axis normal to that of the passage portions 6. There is another passage portion 11 through the valve element which aligns with the body passage portions 6 when the valve element is in its open position. In its closed position the valve element blocks flow of fluid through the body.

The stem 10, as is conventional, is rotatably journaled in a bonnet 12 that is secured to the body, and one or more sealing rings 13 surround the portion of the stem that is within the bonnet to provide a stuffing box by which fluid is prevented from leaking out of the body. The inner end portion of the stem comprises a driver 14 having a noncircular cross-section, received in a correspondingly shaped hole in the valve element, and the outer end portion 15 of the stem is adapted to be fitted with a suitable handle (not shown) or the like by which the valve element can be actuated.

The body 5 of the valve of this invention comprises three main parts, namely an outer tubular component 16 that preferably has an enlarged diameter medial portion which defines the valve chamber 7, and a pair of annular seat members 17, one at each side of the valve element, each defining at least the axially innermost part of one of the passage portions 6 in the body and providing at its inner end a seat 18 with which the valve element is slidably and sealingly engaged. Each seat 18 is a concentric sealing ring of resiliently deformable material that is carried in a groove in the inner end of its seat member, and in the finished valve each such sealing ring is confined under a predetermined axial compression between its seat member and the valve element. The manner in which such compression is established and maintained during assembly of the valve is explained hereinafter, but at this point it is to be observed that each of the seat members 18 is held in place in the outer tubular part 16 by a fillet weld 19 around the axially outer end of the seat member. That weldment forms a seal as well as a bond between each seat member and the outer tubular member, all around them. It will be evident that fluid can flow in either direction through the valve body 5 because of the fact that there are identical sealing seats at each side of the valve element.

As a first step in the manufacture of the valve, the valve element 8 and the annular seat members 17 are made. As here shown, the valve element is fabricated from a drawn or rolled blank of steel which can be pressed to contract its ends to the predetermined minimum diameter of the flow passage portion 11 that extends through it. The valve element is finished by grinding it externally so that it has smooth spherical surfaces that engage the seat members, and of course the square or otherwise noncircular hole for the driver 14 on the stem is made in it. Obviously the valve element could be manufactured in the more usual manner, as a machined casting that is bored to provide the passage 11 through it, but the construction here shown is preferred because it requires less metal, is lighter in weight and can be made at reasonably low cost.

The two annular seat members 17 are identical with one another. Each is essentially a short tube having a relatively thick wall at its axially inner end to accommodate the groove in which the sealing ring 18 is received. From a zone spaced a short distance from its inner end the inner surface of each seat member is frustoconical, diverging axially outwardly as at 21, so that the seat member has minimum wall thickness at its axially outer end.

The outer body part 16 is formed from a single piece of steel or other homogeneous tube material of high tensile strength that is plastically deformable and has good weldability. The blank for it, designated 16' (FIG. 3), is preferably cut from cylindrical drawn tubing having a wall thickness which is suitable to further steps in the manufacturing procedure as described hereinafter, and has a length which is equal to or somewhat in excess of the length of the body of the finished valve. The ends 22 of the blank are preferably cut square, that is, normal to its axis. An opening 23 is made in one side of the blank, intermediate its ends, through which the stem 10 is to extend, and the bonnet 12 is secured to the blank, in coaxial relation to the opening 23, preferably by means of a weldment 24.

The stem 10 can be inserted into the bonnet from inside the body. A circumferential flange or shoulder 25 on the stem, adjacent to its driver portion 14, engages the bottom or inner end of the bonnet to define the limit of outward motion of the stem relative to the body, its inward motion being precluded by engagement of that same flange with the valve element. Note that in the finished valve internal fluid pressure tends to hold the flange 25 in secure engagement with the inner end of the bonnet.

If desired, before the valve element and seat members are inserted into it, the blank can be contracted to some extent on opposite sides of a central zone that is to define the valve chamber 7. Any such contraction must leave at least one of the resultant reduced diameter portions of the blank large enough in inside diameter to permit free axial passage therethrough of the valve element and seat members.

Either before or after their insertion into the tubular blank, the valve element and seat members are connected and held in a temporary subassembly 27 that also comprises a fixture 28. As shown in FIG. 3 the fixture comprises a pair of heads 29, 30, each shaped to have mating engagement in the frustoconical bore portions 21 of the seat members, and a tensioning screw 31 that connects the two heads. In this subassembly, the valve element is in its open position relative to the seat members, and at least one of the heads, designated by 30, has a coaxial cylindrical extension 32 that projects into the passage portion 11 in the valve element to hold the latter in accurate alignment with the seat member engaged by that head. To hold the two heads in coaxial relationship with one another, the head 29 can have a plunger-like coaxial extension 33 that is received in a closely fitting bore in the extension 32.

The screw 31 that connects the two heads 29 and 30 not only cooperates with the heads to fix the seat members and the valve element in coaxial relationship, but enables the heads to be adjustably drawn towards one another. Thus by tightening the screw with the application of a predetermined torque to its head 34, the sealing rings 18 can be placed under a predetermined axial compression. Note that the two sealing rings will inherently be subjected to equal compression forces because the heads are in effect drawn towards one another in clamping engagement with the valve element.

Although it will often be easier to prepare the subassembly 27 while its parts are outside the tubular outer body blank, it will be evident that the subassembly can be made without difficulty with its parts inside the tubular blank. It will also be apparent that the bonnet 12 and the stem 10 can be assembled with the tubular body blank 16 either after or before the subassembly 27 is inserted into it, but in the latter case the body blank must of course have a large enough diameter to allow the subassembly to pass the inwardly projecting driver portion 14 of the stem.

With the subassembly in place in the tubular body blank, the bonnet 12 secured to that blank, and the driver 14 connected with the valve element, the intended axial positions of the seat members relative to the blank are established, and welding the seat members to the blank permanently fixes them in positions such that the predetermined compression of the sealing rings 18 is maintained.

Figure 1:
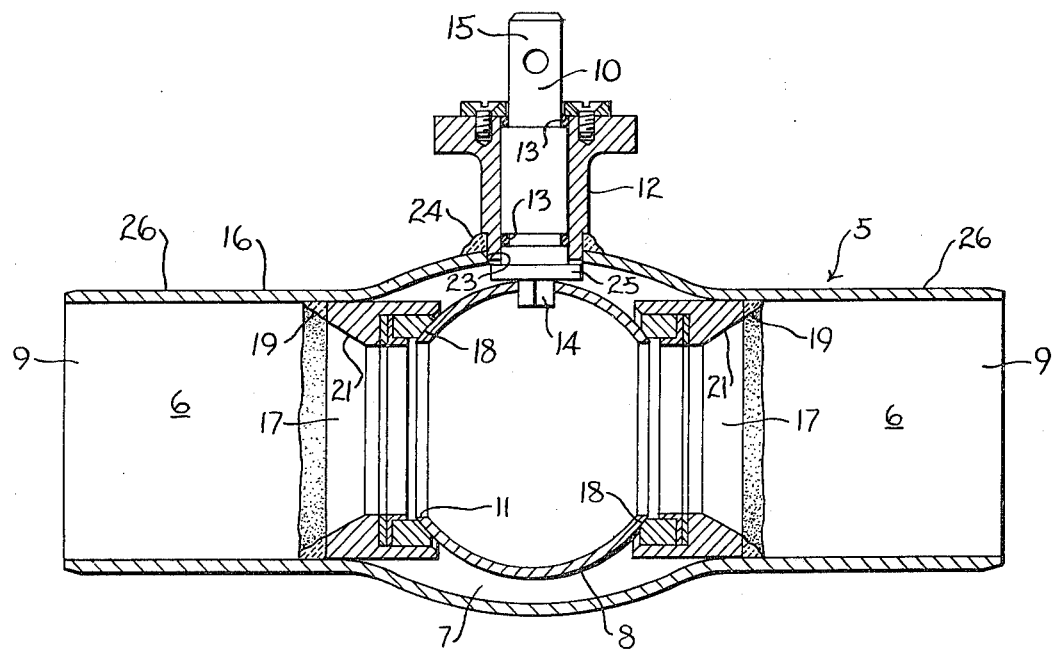
FIG. 1 is a view in longitudinal section of a finished ball plug valve embodying the principles of this invention.

To facilitate the welding operation and insure that the finished valve will have inlet and outlet portions suitable for connection to pipes or tubes of appropriate diameter, reduced diameter neck portions are formed on the blank, at opposite sides of a central zone thereof that defines the valve chamber 7. Of course this is done after the subassembly 27 is placed in the blank, since its effect is to bring the inside surface of the blank into close proximity to the outside surface of the seat members, all around them. In the case of the valve shown in FIG. 1, the reduced diameter necks 26 that result from this operation are cylindrical, the reduction of the necks being preferably performed in two stages. The first stage brings the necks to a diameter smaller than that of the central portion of the blank that is to form the valve chamber 7, but large enough to permit the valve member and seat members to be inserted through the necks; the second stage of reduction is effected with the subassembly 27 in place in the blank and of course brings the inside diameters of the necks to substantially the diameter of the passage portion 11 through the valve element.

Figure 2:
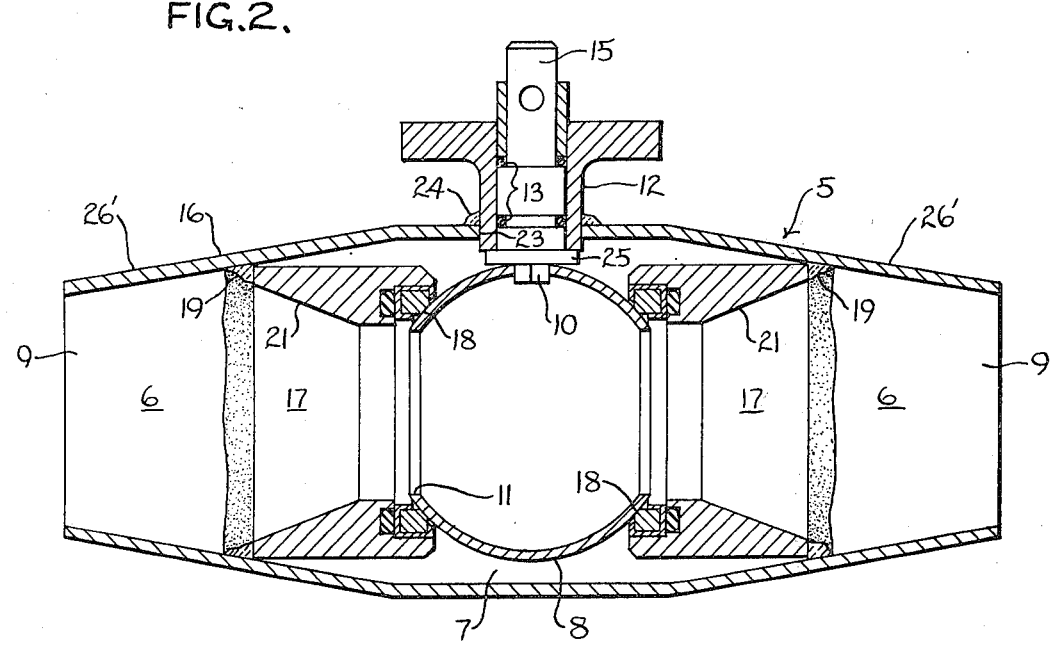
FIG. 2 is a longitudinal sectional view of a modified embodiment of a finished valve.

Alternatively, as may be seen from FIGS. 2 to 4, the necks 26' may be formed to a frustoconical shape, to have an inside diameter at the axially outer end of the seat members that is substantially equal to the outside diameter of the seat members, and so that the end portions forming the ports 9 will have an inside diameter on the order of that of the passage portion 11 through the valve element and an outside configuration that lends itself to connection to pipe or tubing by means of a weldment or sleeve joint. In that embodiment the unreduced tubular blank 16', with the subassembly 27 is placed therein, is placed between press jaws that comprise coaxial frustoconical female die members 36 (see FIG. 4). With a suitable choice of material and wall thickness of the blank, it can be worked cold to gradually reduce the diameter of its end portions and bring them to the form of the frustoconical necks 26' that are seen in FIG. 2 after which the fillet weldments 19 can be made. It will be understood that such frustoconical necks should not be worked beyond the point where they have a slight clearance from the seat members, to avoid imposing upon the seat members any greater axially convergent force than the predetermined one exerted by the fixture 28.

The fixture 28 is of course removed after the seat members are permanently secured to the outer tubular body part 16'.

It will be appreciated that the seat members could be sealingly secured to the outer body part in some suitable manner other than by welding, as for example with the use of an adhesive bonding agent (e.g., epoxy) or by locally rolling the outer tubular part into tightly clinching circumferential engagement with the seat members.

As exemplified by FIG. 5, the fixture that holds the valve element and seat members temporarily assembled with one another need not extend through them but can instead connect them around the outside of the outer tubular body part, the subassembly 27 then being made inside the blank. As there shown, the heads 29' and 30' of the fixture 28' comprise the coaxial jaws of a press or clamp which project into the seat members from outside the ends of the outer tubular blank and each of which projects partway into the valve element to hold it coaxial with the seat members. The heads 29' and 30' are so arranged with respect to the female die members 36 that form the frustoconical neck portions of the finished valve body as to be maintained coaxial with them. The modified form of fixture 28' that is illustrated in FIG. 5 will usually be less convenient than the previously described fixture when the seat members are permanently secured by the fillet welds, but may be advantageous where they are secured in another manner as suggested above.

As a further modification, a reduced diameter neck 26 or 26' could be formed on only one end portion of the blank 16 or 16' before the subassembly or its components was inserted into it, such insertion then being effected through the other end portion of the blank which would be formed to a reduced diameter neck after the subassembly was in place.

So far as the finished valve is concerned, there is no disadvantage in forming the reduced diameter neck portions 26 or 26' on the body blank, inasmuch as the outer body part can have the same, or substantially the same physical properties after formation of the necks as it had before that operation. For that reason the body of the valve of the present invention has security against leakage and failure that was unattainable with prior valve bodies comprising multiple parts welded or otherwise fastened together.

From the foregoing description taken with the accompanying drawings it will be apparent that this invention provides a very sturdy but compact and lightweight valve of the character described which is of such internal configuration as to afford low pressure drop across it, is readily connectable to pipes and tubes, and has its main body member formed as a single, seamless, homogeneous tubular part; and the invention further provides a method of making such a valve whereby the resilient seals between the valve element and its adjacent seat parts of the body can be readily established and maintained under a predetermined compression, even though the fixed parts of the valve body by which such seals are carried are secured to one another by welding.

Those skilled in the art will appreciate that the invention can be embodied in forms other than as herein disclosed for purposes of illustration.

The invention is defined by the following claims:

1. The method of making a valve that comprises a one-piece body in which there are coaxial passage portions opening outwardly to opposite ends of the body from a medial chamber, and a valve element of substantially hard material rotatable in said chamber about an axis transverse to said passage portions to and from a position in which a passage through the valve element is aligned with said passage portions, the external diameter of said valve element being substantially larger than the diameter of said passage portions so that the passage in the valve element has a diameter suitable for ducting connectable with end portions of the valve body, said method being characterized by:

A. forming a one-piece, seamless tubular body blank
      1. of a metal that is plastically deformable in cold condition,
      2. having substantially uniform wall thickness along its length and around its circumference, and
      3. having an inside diameter at least as large as the outside diameter of the valve element;
   B. forming a pair of annular seat members, each having an outside diameter to be receivable in said blank and each cooperable with the valve element to sealingly engage the same without preventing its rotation;
   C. inserting the valve element into the medial portion of the blank and by establishing a connection between the blank and the valve element that constrains the valve element to rotation, confining the valve element against axial motion relative to the blank;
   D. establishing the seat members in the blank at opposite sides of the valve element and spaced from one another by the valve element;
   E. by cold working of the blank, drawing down portions thereof at axially opposite sides of its medial portion to taper said drawn-down portions towards the ends of the blank and decrease their inside diameters near the ends of the blank to less than the outside diameter of the valve element, the drawing down of at least one of said portions being effected after the seat members are established in the blank;
   F. temporarily imposing upon the seat members an axially convergent force by which they are held in sealing engagement with the valve element and coaxial with one another, the axial positions of the seat members relative to the blank being thus established by their engagement with the valve element; and
   G. after said portions of the blank have been drawn down to at least a substantial extent, and while maintaining said force upon the seat members, establishing a fixed, permanent connection between each of the seat members and the blank around the periphery of the seat member and at a zone thereof axially spaced from the valve element.

2. The method of making a valve that comprises a one-piece body in which there are coaxial passage portions opening outwardly to opposite ends of the body from a medial chamber, a valve element of substantially hard material rotatable in said chamber about an axis transverse to said passage portions to and from a position in which a passage through the valve element is aligned with said passage portions, a rotatable stem connected with the valve element for imparting rotation thereto and projecting to the exterior of the body through a hole therein, and coaxial seat members in the valve body which are spaced axially from one another but which have sealing engagement with the valve element at axially opposite sides thereof, the external diameters of said valve element and seat members being substantially larger than said passage portions in the body so that the passage in the valve element has a diameter suitable for ducting connectable with the end portions of the valve body, said method being characterized by:

A. forming a tubular body blank which is
      1. of a metal that is plastically deformable in cold condition
      2. in one piece and seamless
      3. of substantially uniform wall thickness along its length and around its diameter, and
      4. of an inside diameter which is substantially uniform along its length and which is at least as large as the outside diameter of the wall element;
   B. establishing the valve element in the medial portion of the blank, with the stem connected with the valve element and projecting through a hole in the wall of the blank to confine the valve element against axial motion relative to the blank;
   C. inserting the seat members into the blank at axially opposite sides of the valve element;
   D. imposing upon the seat members an axially convergent force by which they are held in sealing engagement with the valve element and coaxial with one another and by which the axial positions of the seat members relative to the blank are established;
   E. by cold working of the blank, drawing down portions thereof at axially opposite sides of its medial portion to taper said drawn down portions towards the end of the blank and decrease their inside diameters near the ends of the blank to less than the outside diameter of the valve element, the drawing down of at least one of said portions being effected after the seat members are established in the blank; and
   F. after said portions of the blank have been drawn down to the extent that there is not more than a small radial spacing between the blank and the seat members, and while maintaining said force upon the seat members, establishing a permanent fixed connection between each of the seat members and the blank around the periphery of the seat member and at a zone thereof axially spaced from the valve element.

3. The method of claim 1 wherein said permanent connection is established by fillet welding around the axially outer end portion of each seat member.

4. The method of claim 1 wherein the diameter of each of said portions of the blank is reduced by forming an axially outward taper substantially all along each of those portions of the blank that extends between the medial portion thereof in which the valve element is received and an adjacent end of the blank.

* * * * *